(12) United States Patent
Jändel et al.

(10) Patent No.: US 6,935,960 B2
(45) Date of Patent: Aug. 30, 2005

(54) SERVER FOR MAPPING APPLICATION NAMES TO TAG VALUES IN DISTRIBUTED MULTI-USER APPLICATION

(75) Inventors: Magnus Jändel, Upplands Vasby (SE); Roland Karlsson, Stockholm (SE)

(73) Assignee: Terraplay Systems AB, Stockholm (SE)

( * ) Notice: Subject to any disclaimer, the term of this patent is extended or adjusted under 35 U.S.C. 154(b) by 0 days.

(21) Appl. No.: 10/415,013

(22) PCT Filed: Oct. 22, 2001

(86) PCT No.: PCT/SE01/02310

§ 371 (c)(1),
(2), (4) Date: Apr. 23, 2003

(87) PCT Pub. No.: WO02/35796

PCT Pub. Date: May 2, 2002

(65) Prior Publication Data

US 2004/0023723 A1 Feb. 5, 2004

(30) Foreign Application Priority Data

Oct. 27, 2000 (SE) ................................................ 0003925

(51) Int. Cl.[7] ................................................ A63F 13/00
(52) U.S. Cl. .......................................... 463/42; 463/43
(58) Field of Search ............................ 463/40, 42–43; 709/203, 219, 223, 229, 238

(56) References Cited

U.S. PATENT DOCUMENTS 5,899,810 A    5/1999  Smith
5,923,842 A    7/1999  Pedersen et al.
6,025,801 A    2/2000  Beitel
6,038,602 A    3/2000  Ishikawa
6,058,399 A    5/2000  Morag et al.
6,112,024 A    8/2000  Almond et al.
6,473,781 B1 * 10/2002 Skagerwall et al. ........ 709/201

FOREIGN PATENT DOCUMENTS

EP   0 880 298 A2   11/1998
EP   0 944 004 A1    9/1999
WO   WO 00/36522    6/2000

OTHER PUBLICATIONS

Abstract, JP05012148 A, Hattori Takanori, Jan. 22, 1993, "Display Method for Network Connection Destination Computer Name".

* cited by examiner

Primary Examiner—Kim Nguyen
(74) Attorney, Agent, or Firm—Young & Thompson (57) ABSTRACT

A server unit for a multi-user application distributed in a communications network. The server unit comprises at least one storing element for storing application names used only in an application session for an application item during the application session and for storing tag values adapted for application data units for sending application data in the communications network, and mapping elements for mapping at least one of the application names to at least one of the tag values. The present invention also relates to a system in the communication network including the server unit, a method for the server unit and a computer program for the server unit.

29 Claims, 3 Drawing Sheets

SERVER FOR MAPPING APPLICATION NAMES TO TAG VALUES IN DISTRIBUTED MULTI-USER APPLICATION

TECHNICAL FIELD

The present invention relates to a system for at least one multi-user application distributed in a communications network. The invention also relates to a server unit included in the network. Moreover the invention relates to a method and a computer program for the server unit.

DESCRIPTION OF RELATED ART

In networked virtual environments where widely distributed, multiple users interact in real-time or close to real time. Such applications aim for a sense of realism and a deeper experience in a virtual world. They are used for military and industrial team training, collaborative design and engineering, multi-player games, virtual shopping, virtual conferences, remote customer support and distance learning. A distributed computer program that is processing a networked virtual environment is in the following description and claims called an application.

The PCT patent application PCT/SE00/00932 addresses the problems with prior art solutions for multi-user applications and is hereby incorporated as reference. For example multi-user games, i.e. games that support two or more, simultaneous users, played over the Internet, are usually games in which the speed is not critical. In for instance fast action games, such as car racing games and battle games, the user must react to what is happening within fractions of a second and these games cannot usually be played with acceptable quality using a client-server synchronization mode or a peer-to-peer synchronization mode, i.e. all clients for the application send application data directly to all other clients if requested.

An application session is in the description and claims defined as a distributed computer process that is processing a networked virtual environment. This virtual environment includes application items that are meaningful for the human users, such as avatars controlled by humans; avatars controlled by an Artificial intelligence (AI); avatars partly controlled by humans and partly controlled by an AI; fixed roles in a game that may be switched between users, e.g. king, warrior, sportsman and referee; objects in the virtual environment; properties of objects and avatars; groups and teams of avatars; groups of objects; groups of groups; locations in the virtual environment; media streams, e.g. voice and video; and collections of media streams. An avatar is a figure that typically represents users in the application and is usually shown as a graphical icon. Usually, when a user via a client enter the application, the user can choose from a number of fanciful avatars. Sophisticated 3D avatars may even change shape depending on what they are doing and they are used for example in games and in 3-D chat sites on the Internet. The application items may have names, hereinafter referred to as application names, within the application and the application names are used by the users and/or by the application for referring to the application items. Application names are often quite long. In a distributed application it is essential that application names are unique within the session. Algorithms for generating session-wide unique application names often result in long application names. It may also be important that application names are meaningful for humans. Short codes are usually less meaningful than long application names.

OBJECT OF THE INVENTION

It is an object of the present invention to save bandwidth in the communications network.

It is also an object of the invention to enable worldwide multi-user sessions in a peer-to-peer synchronisation mode, where a central server doesn't have to be supplied.

SUMMARY OF THE INVENTION

The present invention relates to a system for at least one multi-user application distributed in a communications network, comprising user terminals;

at least one first server unit for storing and receiving application data and distributing application data units to the user terminals;

at least one second server unit for generating content for the application session and sending at least a part of said content to at least one of the user terminals; and at least one third server unit comprising at least one storing means for storing application names used only in an application session for an application item during the application session and for storing tag values adapted for application data units for sending application data in the communications network, and mapping means for mapping at least one of the tag values to at least one of the application names. Hereby is achieved that long application names that are meaningful for human users may be used during the application session at the same time as short codes, i.e. tag values, that are not meaningful or readable for humans is used when sending application data units, i.e. packet with application information used during an application session, to participants and different servers. Also, it is achieved that the application can be written using only internal application names for referring to application items without any dependency of the type of communication protocol being used in the communications network. The tag values are digits representing application tags. An application tag is a code that is used for routing transmitted application items or for finding stored application items. An application tag could be a field in an application data unit header, but could also be a field in the header of any other datagram or communication protocol packet. It consists hence of a set of bits. The application tag has a type that is marked by the corresponding field's position in the protocol or by flags in the protocol that indicate the type of the application tag. In the alternative where an application tag is a field in a general communication protocol it may be a network address, a multicast address or a port number. In the above cited reference, the application tag is an object identifier, a client identifier, a group identifier or a stream object key. The application tags are as short as possible for keeping the required bandwidth of the application as low as possible in the communications network, but the length of the application tags depends on e.g. the type of application and the number of allowed users of the application at the same time.

Preferably the system comprises a separate router for routing application data units depending on application tags that are carried by each one of the application data units.

Suitably, the system comprises at least one fourth server unit for setting up the application session and to which the users register, and at least one fifth server unit for controlling and administrating the application session and reserving storage means for application session data and/or application data units.

Advantageously, the user terminals comprises means for processing at least one application client each, where the at least one application client comprises means for subscribing, receive and process tagged application data units and send tagged application data units. Hereby is achieved that each user at each point in time receives only application data that is needed for e.g. displaying a present view of a virtual environment using a minimum of communication bandwidth.

Suitably each one of the user terminals comprises means for receiving input entries from a user and means for displaying output application data as graphics, video, audio or haptic output. Hereby the system may be used for a large number of different types of multi-user applications with different output to participants in an application session.

The present invention also relates to a server unit for a multi-user application distributed in a communications network, comprising at least one storing means for storing application names used only in an application session for an application item during the application session and for storing tag values adapted for application data units for sending application data in the communications network, and mapping means for mapping at least one of the application names to at least one of the tag values.

In a first embodiment of the server unit, the mapping means maps one of the application names to one of the tag values.

In a second embodiment of the server unit, the mapping means maps more than one of the application names to one of the tag values.

In a third embodiment of the server unit, the mapping means maps one of the application names to more than one of the tag values.

Suitably the application item is an avatar for a human user or an artificial intelligence and the application session is a game session of a multi-user computer game. Alternatively the application session is a multi-part video conference with avatars representing users and a possible AI.

Preferably, the server unit comprises at least one database being stored on the storing means and comprising the tag values and the application names. A database is in the description and the claims defined as a collection of information organised in such a way that a mapping means can select desired pieces of data.

Advantageously, the mapping means is a database management system for the application session.

Suitably, the at least one storing means is adapted for storing at least one owner name for an owner of the at least one of the application names, and the mapping means is adapted for mapping at least one owner name to at least one of the tag values.

Furthermore the present invention also relates to a method for a server for mapping application names to tag values for at least one multi-user application distributed in a communications network, where the tag values is used for addressing and routing application data units for sending application data in the communications network. The method comprises the steps of:

storing the tag values in at least one storage means for an application session, receiving at least one application name that is intended to be used for an application item during the application session;

mapping the at least one application name to at least one of the tag values;

storing the at least one application name in the at least one storage means;

sending the at least one of the tag values to at least one receiving node in the communications network.

Advantageously the method also comprises the step of responding to queries from at least one user about the mapping of the at least one application name to the at least one of the tag values when the at least one user knows the at least one application name or to quieries from the at least one user about the mapping of the at least one of the tag values to the at least one application name when the at least one user knows the at least one of the tag values.

Preferably the storing of each one of the tag values is in a separate record in at least one database comprised in the at least one storage means.

Suitably the storing of the at least one application name is in a field in the same record as the at least one of the tag values to which the at least one application name is mapped.

Advantageously the at least one application name is received from an application client being able to participate in the application session. The application client is defined in the specific description.

Also, the method may comprise the step of receiving an owner name for an owner of the at least one application name;

mapping the owner name to at least one of the tag values; and storing the owner name in the at least one storage means.

Suitably, the method comprises the step of: responding to queries from at least one user about the mapping of the owner name to the at least one of the tag values when the at least one user knows the owner name or to queries from the at least one user about the mapping of the at least one of the tag values to the owner name when the at least one user knows the at least one of the tag values.

Moreover, the present invention relates to a computer program for a multi-user application distributed in a communications network, comprising computer readable code means for causing a server unit to receive at least one application name that is intended to be used for an application item during an application session;

computer readable code means for causing the server unit to map the at least one application name to at least one of a plurality of tag values being stored in at least one storage means in the server unit and adapted for application data units for sending application data in the communications network; and computer readable code means for causing the server unit to store the at least one application name in the at least one storage means.

Preferably, the computer program comprises computer readable code means for causing the server unit to send the at least one of the tag values to at least one receiving node in the communications network, and computer readable code means for causing the server unit to store the at least one application name in at least one database comprised in the at least one storing means.

Suitably the computer program comprises computer readable code means for causing the server unit to store the at least one application name in at least one field in at least one record in the at least one database, where the at least one record comprises a field for the at least one of the tag values to which the at least one application name is mapped.

Preferably the computer program comprises computer readable code means for causing the server unit to respond to queries from at least one user about the mapping of the at least one application name to the at least one of the tag values when the at least one user knows the at least one application name, and computer readable code means for causing the server unit to respond to queries from the at least one user about the mapping of the at least one of the tag values to the at least one application name when the at least one user knows the at least one of the tag values.

Advantageously the computer program comprises computer readable code means for causing the server unit to receive an owner name for an owner of the at least one application name;

computer readable code means for causing the server unit to map the owner name to the at least one of the tag values; and computer readable code means for causing the server unit to store the owner name in the at least one storage means.

Suitably the computer program comprises computer readable code means for causing the server unit to respond to queries from at least one user about the mapping of the owner name to the at least one of the tag values when the at least one user knows the owner name, and computer readable code means for causing the server unit to respond to queries from the at least one user about the mapping of the at least one of the tag values to the owner name when the at least one user knows the at least one of the tag values.

The present invention also relates to a computer program product comprising a computer useable medium and the computer program, which is being recorded on the computer useable medium. The computer program product may be a hard disk, a compact disc, a digital versatile disc, a diskette, a tape, flash memory etc.

BRIEF DESCRIPTION OF THE DRAWINGS

The objects, advantages and effects as well as features of the present invention will be more readily understood from the following detailed description of a preferred method, as well as embodiments, when read together with the accompanying drawings, in which.

DETAILED DESCRIPTION OF EMBODIMENTS

While the invention covers various modifications and alternative constructions, preferred embodiments of the invention are shown in the drawings and will hereinafter be described in detail. It is to be understood, however, that the specific description and drawings are not intended to limit the invention to the specific forms disclosed. On the contrary, it is intended that the scope of the claimed invention includes all modifications and alternative methods thereof falling within the spirit and scope of the invention as expressed in the appended claims to the full range of their equivalents.

Some of the units and elements shown and discussed in this application are discussed in more detail in the co-pending applications SE- . . . and SE- . . . , which are hereby incorporated by reference in its entirety for all and any purposes.

Figure 1:
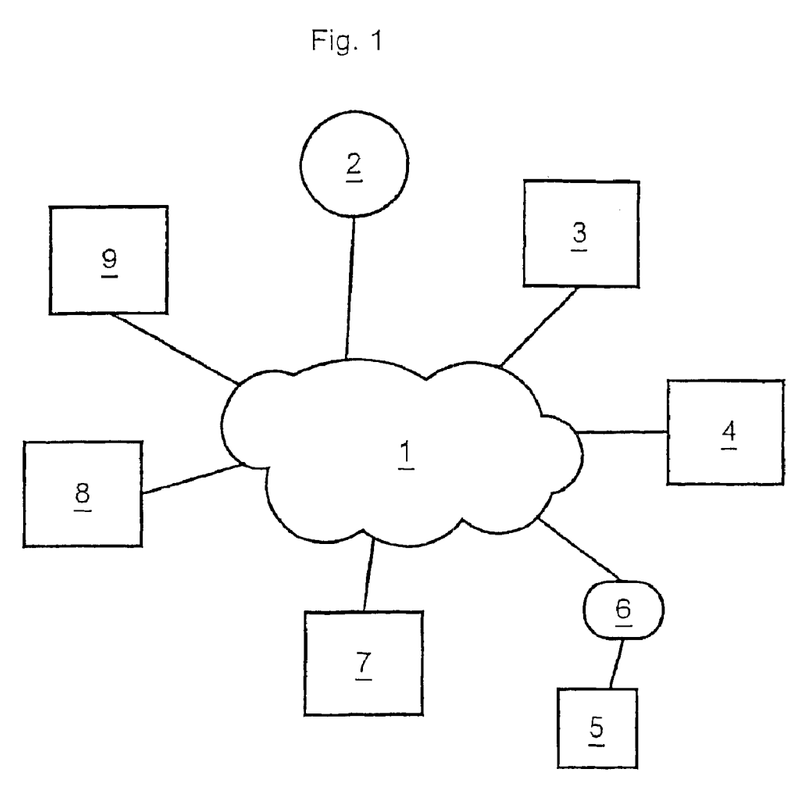
FIG. 1 shows an embodiment of a communications network according to the invention.

A packet-oriented communications network 1, such as the Internet, for providing an application network according to a first embodiment of the invention is schematically shown in FIG. 1. The communications network 1 includes communication links and routers for general-purpose communications protocols, such as Internet protocols. These links and routers, together with servers not being involved in the present invention, are not illustrated for a better understanding of the invention. In order to support application sessions in networked multi-user environments, there are several nodes included in the communications network.

A first node comprises a first server unit 2 in the form of an application server (AS) that stores and receives application data. The AS distributes application data to application clients according to queries, requests or subscriptions. Such queries, requests or subscriptions may be expressed in terms of subscriptions to application data units carrying application tags, which will be explained later.

A second node comprises an application router 3 (AR). The AR 3 is routing application data units, i.e. forwarding the application data units to their destination. The routing is dependent on the application tags that are carried by each application data unit. The AR 3 receives packets containing application data units from the communications network 1. Also, the AR 3 reads the application tags of the application data units and resends the application data units over the communication network 1 with a network address that depends on the application tags and optionally also on client subscriptions.

A third node comprises a second server unit 4 in the form of an application content generating server (ACGS). The ACGS generates content for an application session. In one embodiment used as an example only, the ACGS is a game server in multiplayer games that makes decisions about kills, collisions and damage. It may also be responsible for running avatars. When entering the system for the application, a number of avatars may be chosen. The ACGS may also be responsible for running avatars that appear to be human-controlled but is managed by an AI. The ACGS receives and processes application data units and sends application data units carrying application tags.

A fourth node for a user terminal 5 in the form of a user terminal, such as a game console or personal computer (PC) is connected to the communications network via an application client 6 (AC). The AC 6 is a local instance of the computer process that is simulating the networked virtual environment and could be e.g. a Windows/UNIX process or thread. One computer process could run one or several ACs 6. The AC 6 is thus a logical instance of a game or simulation and is not always identical to any specific computer process, thread, program or machine. For example the computer or game console that is running the AC 6 has means for receiving input from the user and is displaying the output of the application as haptic, i.e. tactile; graphics; video or audio output. The AC 6 is able to subscribe to, receive and process tagged application data units and send tagged application data units. A network interface software comprised in the client machine, i.e. the user terminal 5, has computer readable code means for translating between application names and application tags and send corresponding tag values to other ACs 6, the AS, AR, ACGS and the other servers described below. Furthermore the network interface software has computer readable code means for allowing the user terminal 5 to communicate with a third server unit 7 (described below) when needed and sending packets containing application data units carrying application tags over the communications network 1.

A fifth node comprises a third server unit 7 in the form of an application session name server (ASNS) connected to the communications network. The ASNS maps application names to application tags, i.e. relate the application names with the application tags, and vice versa and responds to operations such as setting names, removing names and inquiring about names. This will later be described more in detail. Memory for application databases and processing resources are reserved for an application session according to a session profile and for the AC 6 according to a client profile. The client profile consists of a set of application network parameters and is used to initialise and prepare a programmable application network and the user terminal before a client group joins the application session. However, the client profile is not a part of this invention, but is described in more detail in a co-pending patent application SE- . . . . The session profile consists of a set of application network parameters valid for an application session and is used to initialise and prepare the programmable application network before an application session is started. The session profile is also not a part of this invention and is described in more detail in the co-pending patent application SE- . . . . The ASNS uses generic interfaces so that several different applications can be supported. Using the ASNS means thus that a system comprising generic component preferably is built, which of course is more economical than to build separate systems for different applications. The application can use any name format independently of the communication protocols. This makes it easier to develop new applications and, in particular, to port existing applications to new communication services. An application communication protocol can use legacy tag formats and still be useful for new generations of applications.

A sixth node comprises a fourth server unit 8 in the form of an application lobby server (ALS) for setting up the application session. Participants register at the ALS and negotiate to start an application session. A service provider may use the ALS to authenticate participants and to handle accounting. The ALS is optional, depending on the type of application session.

A seventh node includes a fifth server unit 9 in the form of an optional application network management system (ANMS). The ANMS is used for controlling and administrating application sessions that may have been negotiated at an ALS. The ANMS is also used for reserving resources, optionally in the communications network and at the AS, AR, ACGS and ASNS nodes. Moreover, the ANMS may be used for handling error conditions. The ANMS is using the session profile and the client profile for configuring the programmable application network, which at least is a part of the communications network 1.

Although only one example of a node with one of the above described servers 2, 4, 7, 8, 9, are shown in FIG. 1 in order to facilitate understanding of the invention, there may be more than one of the these servers in a node. Also there may be several of each of the above described servers 2, 4, 7, 8, 9, in the communications network 1 in order to provide better response times and back-up if one of the nodes ceases to operate due to hardware or software failure.

Figure 2:
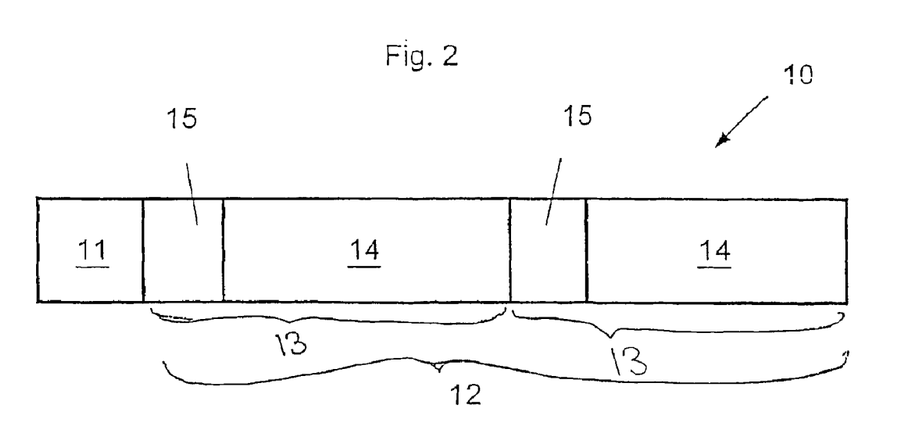
FIG. 2 shows a packet with an application data unit.

The communications network 1 is typically using several packet-based communication protocols e.g. IP protocols such as TCP/IP and UDP/IP. The communications network 1 carries packets 10, one of which is illustrated in FIG. 2, from senders to receivers. The packet 10 typically comprises a header 11 and a payload 12. The header 11 may include one or several network addresses that are used by routers in the communications network 1 for sending the packet 10 to the receiver. Protocols are layered so that the payload of one protocol layer may include one or several packets of the next protocol layer. Application data units 13 are carried as payload in the network protocol packets such as the packet 10.

Optionally, the application includes its own communication protocol. An application data unit consists of a header 15 and payload 14. The header contains one or several application tags. The payload 14 consists of application specific data such as positions, avatar properties, coded voice data etc.

Figure 3:
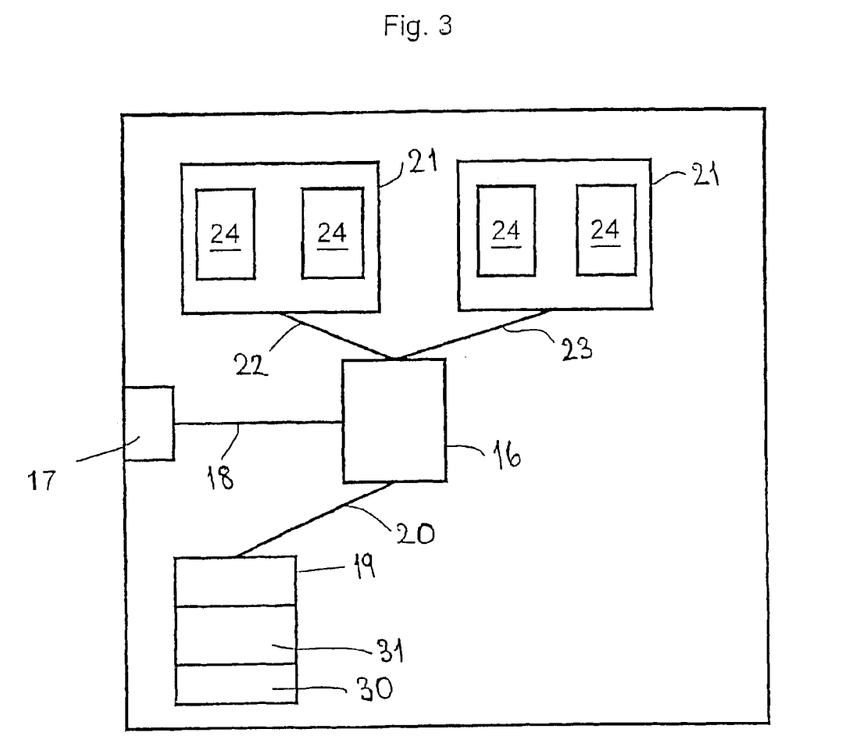
FIG. 3 shows a schematic diagram of a server according to the invention.
Figure 4:
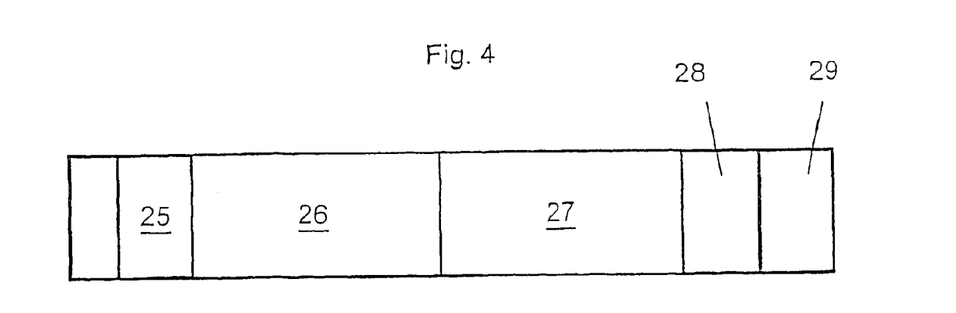
FIG. 4 illustrates a record in a database in the server.

An example of anode that comprises the ASNS will now be described in conjunction with FIG. 3. A central processing unit (CPU) 16 is connected to the communications network 1 via a communication port 17 and a first bus 18. The CPU 16 is also connected to a storage means embodied as a first read only memory (ROM) 19 via a second bus 20. Here, the ASNS supports two application sessions, but is also able to support only one or more than two application sessions. Each application session has its own database, here called application session database (ASDB) 21, which is stored on second storage means embodied as hard disks. The CPU 16 is therefore also connected to the two ASDBs 21 via a third and a fourth bus, 22 and 23 respectively, which illustrate that each ASDB 21 is stored on different hard disks. Each ASDB 21 comprises a session identifying means in the form of a software and two sub-databases, here called application tag databases (ATDBs) 24. Although only two ATDBs 24 have been shown for each ASDB 21, it is to be understood that each one of the ASDBs 21 may comprise only one or more than two ATDBs 24. Each ATDB 24 is handling an application tag of one given type. A record in a table in one of the ATDBs 24 is illustrated in FIG. 4 and comprises the following fields:

a Tag value field 25. This is a set of bits that represents or encodes a valid value of the corresponding application tag field.

Application name field 26. Here an arbitrary application name is stored e.g. as a string of bytes that the application can interpret as a valid application name. The length of the application name field 26 may be set to a maximum length where an entered application name of a longer length than the maximum length is considered as an invalid application name and is therefore rejected when trying to set the application name. A first alternative is to store a value of the length of the application name field 26 together with the application name. This enables a client user to select an application name of an arbitrary length. A second alternative is to mark the end of the application name with a predetermined symbol, which is not allowed to be a character in the application name. A third alternative is that the length is an initialization parameter for each session, where the allowed maximum size of the application name is the initialization parameter set by for example an approved client or an application service provider.

Record owner field 27. An owner is a reference to a certain user, a client application, an application name or an application account that created the content in a selected field in the record. The record owner field is optional.

Time reference field 28, which describes e.g. the time at which the record was created or modified. The value in the time reference field 28 could correspond to a global time or a session related time. This field is optional.

Timeout field 29, describing how long the record should be stored in the ATDB 24. The timeout field may in some applications indicate the time for participating in an application session. This field is also optional.

Other optional fields that are suitable for different applications may be comprised in the ATDB 21.

In this embodiment, the ROM 19 carries code comprised in a mapping means 30, which here is a database management system (DBMS), i.e. a computer program that controls the organisation, storage, retrieval, and optionally security and integrity of data in the ATDBs 24 and ASDBs 21. Through the DBMS 30 and a network operating system (NOS) 31, which also is installed on the ROM, the ATDBs 24 accept requests from the application and instruct the NOS 31 to transfer the appropriate application data. Although the DBMS 30 is shown in the ROM 19, the DBMS 30 could of course also be stored on one of the hard disks that comprise the ASDBs 21

The above described fields and the mapping means enable support of at least the following operations: set the application name for a given tag value, set the tag value for a given application name, send the result of a query for the application name associated with a given tag value to a given recipient, send the result of a query for the tag value associated with a given application name to a given recipient, and invalidate a field or record.

The ATDB 24 also support the following optional operations: set the owner of a given tag value; set the owner of a given application name; get the owner of a given application name; get the owner of a given tag value; find the records belonging to a given owner; remove all records belonging to a given owner; find a tag value without an owner, set application name and owner and return tag value to sender; set the timeout field of a given record; set the time reference field of a given record; and update any optional record.

Two of the fifteen operations disclosed above will now be explained more in detail. From the explanation of these two operations and subsequent text, the rest of the mentioned operations shall be obvious to a person skilled in the art.

Figure 5:
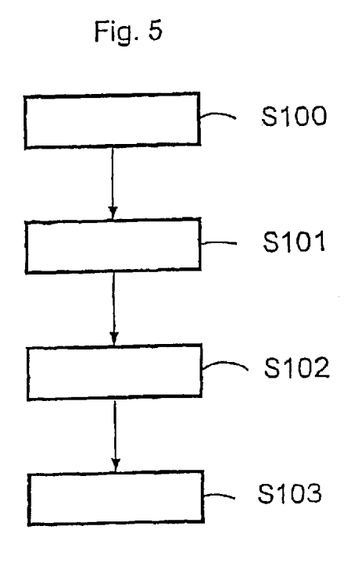
FIG. 5 shows a flow chart for an operation to get a name of a given application tag.

FIG. 5 illustrate the operation of sending the result of a query for the application name associated with a given tag value to a recipient. A client has received an application data unit 13 with a new application tag via the AC 6 and wants the application name belonging to the new application tag. In step S100, the AC 6 sends a query about the application name for the new application tag to the ASNS. In step S101 the ASNS receives the query. Now the ASNS search for a tag value in the tag value field 25 corresponding to the new application tag. This is done in step S102 by searching in the ATDB 24. When the tag value is found, the application name in the same record is copied and in step S103 sent back to the AC 6 that sent the query. The AC 6 that receives the name could display the application name in the user terminal 5.

Figure 6:
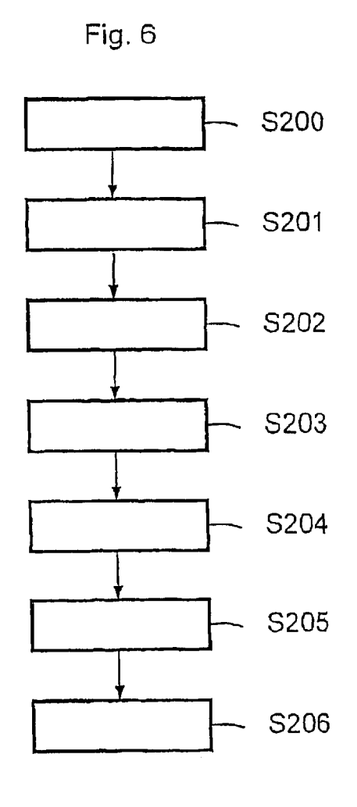
FIG. 6 shows a flow chart for another possible operation due to the invention.

An example of the operation for finding a tag value without an owner, set application name and owner and return tag value to sender, will now be described in conjunction with FIG. 6. In step 200, the AC 6 sends a request for an application tag without an owner. The request includes an application name and the owner identifier. In step S201, the ASNS receives the request and register the network address of the user terminal 5. Then, in step S202, the ASNS search in the record owner fields 27 in the ATDB 24 for an empty record owner field. The record of the first found empty record owner field 27 is used for getting the tag value in the corresponding tag value field 25. This is done in step S203. In step S204, the ASNS retrieves the application name and the owner identifier from the query. The application name and owner is stored in the application name field 26 and the record owner field 27 respectively. In step S205, the ASNS sends the available tag value to the requesting AC 6. If there is not any available tag value, the ASNS sends a message to the AC 6 that e.g. the application session does not allow any more participants. If the operation was successful the tag value is occupied by the owner and in step S206 the ASNS may also send the tag value to other ACs and servers used for the application.

In some applications only one application name could be mapped by the DBMS 30 to a free tag value. A desired application name, e.g. 'Black_King', may be mapped to a free tag value in the ATDB 24 by storing the application name in the application name field 27 in a record where the application name field 27 is 'empty'. This is for instance done by using Structured Query Language (SQL) code, such as:

INSERT INTO TableName (ApplicationName) VALUES ("BLACK_KING") WHERE TagValue=(SELECT TagValue FROM TableName where ApplicationName="")

The ASNS ensures optionally that each tag value is connected to only one application name for each application tag type. Errors are reported, to for example the AC 6, if an operation that violates this is attempted. Alternatively, the ASNS may allow s several application names for a given tag value. Clients could then assign aliases for application names.

An example of SQL code for mapping two desired application names to a free tag value is:

INSERT INTO TableName (ApplicationName1) VALUES ("Black_King") WHERE TagValue=(SELECT TagValue FROM TableName where ApplicationName="")
INSERT INTO TableName (ApplicationName2) VALUES ("The_King") WHERE ApplicationName1="Black_King"

In a second alternative, the ASNS allows several application tags to be assigned to one application name. The application name would then be connected to a cluster of network resources, for example available user terminals 5 in the communications network 1.

Optionally, each name may be used at most once for each application tag type. Errors are reported if an operation that violates this is attempted.

In one embodiment of the invention, authorization to perform operations for the ASNS is controlled. Different clients may have different authorities and in particular, the owner of an application name could be set to be the only one that is entitled to change or invalidate the application name.

As in FIG. 1 there may be only one ASNS involved in a session. The advantage with this is that no means for updating is required. Alternatively, there may be a plurality of ASNS in a session and that requires means and a method for ensuring updating between the different ASNS. General methods for keeping a distributed database updated can be used and does not belong to the present invention. Hence these updating methods are not described more.

Optionally, the ASNS could be partitioned on several locations where different parts of the ATDB 24 are located in different server units or nodes.

Furthermore, a simple method is to allow application names to be set but not to allow application names to be changed. This means that any of the set application names must be communicated reliably to all instances of the ATDB 24.

Some examples of application sessions that could use the ASNS will now be described for a better understanding of the advantages and options of the present invention.

The first application session example relates to using player aliases. A multiplayer game such as a so-called real-time action game allows players to join and leave the game during the application session. Each player has an alias, such as "Hellfire" or "Evil_Reaper". An avatar that represents a player is marked with the player's alias and the alias is also used in lists of scores and kills. Each alias is a string that is coded as several bytes. "Hellfire" and "Evil_Reaper" require e.g. 9 and 12 bytes respectively.

Application data units are User Datagram Protocol (UDP) packets that carry each avatars' position, arms, damage etc. Each application data unit 13 is marked with a application tag that identifies the related player. In a game that involves at most 256 players the application tag could consist of one byte. Each player is represented by a unique combination of 8 bits.

The ASNS is used to connect a player alias to a tag value. A player that joins the session gets an unused tag value from a game server or from the ASNS by the 'Find an application tag without an owner, set name and owner, return tag value to sender' operation described above in connection to FIG. 6. The player sets a name corresponding to his alias that is connected to the tag value. After that, the player sends the properties of his avatar to the other players through their AC 6 and user terminal 5.

Any other user terminal 5 that receives an application data unit 13 with a new application tag will query the ASNS for the name that belongs to the application tag using the 'send the result of a query for the application name associated with a given tag value to a given recipient' operation described above in connection to FIG. 5. The new avatar can now be displayed by the application. The other client might also find the new alias in the application data. The other client could then find the tag value that corresponds to the alias via the ASNS and subscribe to the communication channel that corresponds to the tag value.

Clients that leave the game could invalidate the ASNS record that corresponds to the alias thus releasing the tag value. A timeout mechanism including the Timeout field 29 in the corresponding record, can be used to release the tag value even if a leaving client fails to invalidate the record. The time reference field 28 could e.g. by used by an accounting system for a service provider.

A second example of an application session that benefits from an ASNS is a peer-to-peer flight simulation game. Here, one of the user terminals 6 is running the flight control AI. Flight control instructions and information is distributed via a tagged communication channel. The application tag that belongs to coding of the flight control function, is owned by the client that presently is running the flight control AI. That client has for example defined the name FLIGHT_CONTROL for the relevant application tag in the ASNS. For example application items illustrating heart beats are sent using that tagged channel to show that the flight control is operational. A new client knows the name FLIGHT_CONTROL and will ask the ASNS for the corresponding application tag and then subscribe to it.

Suppose that the client that runs the flight control leaves suddenly. The record in the ATDB 24 for FLIGHT_CONTROL will be removed automatically when the leaving client invalidates it or because a set timeout stored in the timeout field 29 in the ATDB 24 is read from the ATDB 24. After the client has left, remaining clients notice that the heart beats from flight control has stopped. Each remaining client waits a random time and then tries to set an ASNS tag value definition with the application name FLIGHT_CONTROL. The tag value is arbitrary and the ASNS will accept the first definition that arrives since the name is undefined. Any following attempt to set the application name will be rejected. Each client will wait for a fixed time and then ask the ASNS for the tag value that carries the application name FLIGHT_CONTROL. The ASNS distributes the application name to all clients and the client that owns the object starts a flight control process and continues to send flight control data. The same function can be achieved using a client that takes the role of a came manager in an application that requires or optionally include a game manager.

A third example of an application session that benefits from the present invention is a peer-to-peer game with an open-ended world, in this example a peer-to-peer computer game with a virtual world with an open-ended geography, e.g. a space strategy game. A team that joins the game brings a map showing their own planets. Planets and other sites may be destroyed in the fighting. All new geographical sites (planets, cities, buildings, ships) are named by designers of the maps and there are many more sites than players.

Game data is distributed via a set of channels. Each channel is marked by a unique application tag. Each application tag corresponds to a specific site in the game world. Clients that are controlling an avatar that is located at a given site appends the corresponding application tag to the data units that show e.g. their positions. The clients are also subscribing to data with the same application tag. This means that they selectively receive data about all avatars at the site.

There are a limited number of available application tags and the number of application tags is much smaller than the number of application names or geographical locations in the game. The ASNS is used for dynamically allocating a restricted number of application tags to geographical sites. A first player that arrives on e.g. an empty planet called LABAN asks the ASNS for the tag value corresponding to LABAN. Since the planet is uninhabited, the player selects an unused application tag and sets the application name. The next player that lands on LABAN will find the application name defined and can subscribe to application data with the application tag. The last player that leaves LABAN notifies the first player that he should release the application tag. Thereafter all subscriptions for application data sent in packets comprising the application tag, will be cancelled automatically.

What is claimed is:

1. A method for a server (7) for mapping application names to tag values for at least one multi-user application distributed in a communications network (1), the method comprising the steps of:

addressing and routing application data units (13) related to an application session for sending application data in the communications network (1) using the tag values to address and route the application data units, storing the tag values in at least one storage means for the application session, receiving at least one application name for an application item to be used during the application session;

mapping the at least one application name to at least one of the tag values;

storing the at least one application name in the at least one storage means; and sending the at least one of the tag values to at least one receiving node in the communications network (1).

2. The method according to claim 1, further comprising the step of storing each of the tag values in a separate record in at least one database (24) in the at least one storage means.

3. The method according to claim 2, further comprising the step of storing the at least one application name in an application name field (26) in the same record as the at least one of the tag values to which the at least one application name is mapped.

4. The method according to claim 1, wherein the at least one application name is received from an application client (6) that participates in the application session.

5. The method according to claim 1, further comprising the step of responding to queries from at least one user about the mapping of the at least one application name to the at least one of the tag values when the at least one user knows the at least one application name or to queries from the at least one user about the mapping of the at least one of the tag values to the at least one application name when the at least one user knows the at least one of the tag values.

6. The method according to claim 1, further comprising the steps of receiving an owner name for an owner of the at least one application name;
mapping the owner name to at least one of the tag values; and
storing the owner name in the at least one storage means.

7. The method according to claim 6, further comprising the step of responding to queries from at least one user about the mapping of the owner name to the at least one of the tag values when the at least one user knows the owner name or to queries from the at least one user about the mapping of the at least one of the tag values to the owner name when the at least one user knows the at least one of the tag values.

8. A system for at least one multi-user application distributed in a communications network (1), comprising
user terminals (5);
at least one first server unit (2) for storing and receiving application data and distributing application data units (13) related to an application session in the communications network to the user terminals (5);
at least one second server unit (4) for generating content for the application session and sending at least a part of said content to at least one of the user terminals; and
at least one third server unit (7) comprising at least,
one storing means for storing application names used in the application session for an application item and for storing tag values that are used to address and route the application data units (13) for sending application data in the communications network (1), and
mapping means (30) for mapping at least one of the tag values to at least one of the application names.

9. The system according to claim 8, further comprising a router (3) for routing the application data units (13) depending on application tags that are carried by each one of the application data unit (13).

10. The system according to claim 8, further comprising at least one fourth server unit (8) for setting up the application session and to which users register.

11. The system according to claim 8, further comprising at least one fifth server unit (9) for controlling and administrating the application session and reserving said storage means for at least one of the application data and the application data units.

12. The system according to claim 8, wherein the user terminals comprises means for processing at least one application client (6), where the at least one application client (6) comprises means for subscribing, receiving and processing the tagged application data units (13) and sending the tagged application data units (13).

13. The system according to claim 8, wherein each one of the user terminals (5) comprises means for receiving input entries from a user and means for displaying output application data as at least one of graphics, video, audio and haptic output.

14. A server unit (7) for a multi-user application distributed in a communications network (1), comprising:
at least one storing means for storing application names used only in an application session for an application item during the application session and for storing tag values that are used to address and route application data units (13) in the communications network, the application data units being related to the application session and for sending application data in the communications network (1), and
mapping means (30) for mapping at least one of the application names to at least one of the tag values.

15. The server unit (7) according to claim 14, wherein the mapping means (30) maps more than one of the application names to one of the tag values.

16. The server unit (7) according to claim 14, wherein the mapping means (30) maps one of the application names to more than one of the tag values.

17. The server unit (7) according to claim 14, wherein the application item is one of an avatar for a human user or an artificial intelligence; an avatar partly controlled by the artificial intelligence and partly controlled by the human user; a fixed role in a game that may be switched between users; objects in a virtual environment; properties of objects and avatars; groups and teams of avatars; groups of objects; groups of groups; a location in the virtual environment; and a media stream or collections of media streams.

18. The server unit (7) according to claim 17, wherein the application session is a game session of a multi-user computer game.

19. The server unit (7) according to claim 17, wherein the application session is a multi-part video conference.

20. The server unit (7) according to claim 14, wherein at least one database (24) is stored on the storing means and comprises the tag values and the application names.

21. The server unit (7) according to claim 14, wherein the mapping means (30) is a database management system for the application session.

22. The server unit (7) according to claim 14, wherein the at least one storing means is adapted for storing at least one owner name for an owner of the at least one of the application names, and the mapping means (30) is adapted for mapping the at least one owner name to at least one of the tag values.

23. A computer program for a multi-user application distributed in a communications network (1), the program being embodied in a computer readable medium and comprising:
computer readable code for causing a server unit (7) to receive at least one application name that is intended to be used for an application item during an application session;
computer readable code for causing the server unit (7) to map the at least one application name to at least one of a plurality of tag values being stored in at least one storage means in the server unit (7), the tag values being used to address and route application data units (13) for sending application data in the communications network (1); and
computer readable code for causing the server unit (7) to store the at least one application name in the at least one storage means.

24. The computer program according to claim 23, further comprising computer readable code for causing the server unit (7) to send the at least one of the tag values to at least one receiving node (5) in the communications network.

25. The computer program according to claim 23, further comprising computer readable code for causing the server unit (7) to store the at least one application name in at least one database (24) in the at least one storing means.

26. The computer program according to claim 25, further comprising computer readable code for causing the server unit (7) to store the at least one application name in at least one application name field (26) in at least one record in the at least one database (24), where the at least one record comprises a tag value field (25) for the at least one of the tag values to which the at least one application name is mapped.

27. The computer program according to claim 23, further comprising computer readable code for causing the server unit (7) to respond to queries from at least one user about mapping of the at least one application name to the at least one of the tag values when the at least one user knows the at least one application name, and computer readable code for causing the server unit (7) to respond to queries from the at least one user about mapping of the at least one of the tag values to the at least one application name when the at least one user knows the at least one of the tag values.

28. The computer program according to claim 23, further comprising computer readable code for causing the server unit (7) to receive an owner name for an owner of the at least one application name;

computer readable code for causing the server unit (7) to map the owner name to the at least one of the tag values; and computer readable code for causing the server unit (7) to store the owner name in the at least one storage means.

29. The computer program according to claim 28, further comprising computer readable code for causing the server unit (7) to respond to queries from at least one user about mapping of the owner name to the at least one of the tag values when the at least one user knows the owner name, and computer readable code for causing the server unit (7) to respond to queries from the at least one user about mapping of the at least one of the tag values to the owner name when the at least one user knows the at least one of the tag values.

* * * * *